(12) United States Patent
Kawano et al.

(10) Patent No.: US 9,588,567 B2
(45) Date of Patent: Mar. 7, 2017

(54) CONTROL APPARATUS, COMPUTER-READABLE STORAGE MEDIUM, AND INFORMATION PROCESSING APPARATUS

(71) Applicant: FUJITSU LIMITED, Kawasaki-shi, Kanagawa (JP)

(72) Inventors: Yoko Kawano, Yokohama (JP); Terumasa Haneda, Machida (JP); Atsushi Uchida, Kawasaki (JP); Toshihiro Tomozaki, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 55 days.

(21) Appl. No.: 14/554,161

(22) Filed: Nov. 26, 2014

(65) Prior Publication Data
US 2015/0169040 A1 Jun. 18, 2015

(30) Foreign Application Priority Data
Dec. 16, 2013 (JP) ................................. 2013-259221

(51) Int. Cl.
*G06F 1/30* (2006.01)
*G06F 11/14* (2006.01)
*G06F 12/0868* (2016.01)
*G06F 12/08* (2016.01)
*G06F 11/34* (2006.01)

(52) U.S. Cl.
CPC ............ *G06F 1/30* (2013.01); *G06F 11/1441* (2013.01); *G06F 11/3419* (2013.01); *G06F 12/0868* (2013.01); *G06F 2201/88* (2013.01); *G06F 2212/313* (2013.01)

(58) Field of Classification Search
CPC ........ G06F 1/30; G06F 13/28; G06F 11/1441; G06F 11/3419; G06F 2201/88; G06F 12/0868
See application file for complete search history.

(56) References Cited

U.S. PATENT DOCUMENTS

| 8,924,352 B1 * | 12/2014 | Andruss | G06F 11/1461 707/640 |
| 2005/0015650 A1 * | 1/2005 | Jun | G11B 20/18 714/5.1 |
| 2009/0249008 A1 * | 10/2009 | Hosaka | G06F 11/1441 711/162 |

FOREIGN PATENT DOCUMENTS

| JP | 6-051918 | 2/1994 |
| JP | 6-309234 | 11/1994 |
| JP | 2001-135042 | 5/2001 |
| JP | 2007-213137 | 8/2007 |

* cited by examiner

*Primary Examiner* — Eric S Cardwell
(74) *Attorney, Agent, or Firm* — Fujitsu Patent Center

(57) ABSTRACT

A control apparatus that causes data in a first storage unit to be written in a second storage unit, with power supplied from a sub power supply, when supply of power from a main power supply is discontinued, the control apparatus includes a remaining feed duration obtaining unit that obtains remaining feed duration during which the sub power supply can supply the power; and a retry count setting unit that sets a maximum retry count for writing the data from the first storage unit to the second storage unit, based on the remaining feed duration obtained by the remaining feed duration obtaining unit, when an error occurs while the data is being written.

15 Claims, 14 Drawing Sheets

FIG. 7

```
CALCULATION RESULTS FOR THE FOLLOWING EXAMPLE:

WRITE PERFORMANCE = 250 MB/s
SIZE OF 1 ACCESS = 1 MB
LINK COUNT = PCIe LANE ×4
TOTAL BACKUP SIZE = 8 GB
PREVIOUS P-OFF SEQ = 1 SECOND
------------------------
7 GB DATA HAS BEEN TRANSFERRED (30 SECONDS ELAPSED)
REMAINING FEED DURATION = 50 SECONDS
WRITE ERROR OCCURS
------------------------
S37:OBTAIN REMAINING BACKUP DATA SIZE
    TOTAL BACKUP SIZE - TRANSFERRED DATA SIZE
    ⇒1GB
S38:OBTAIN REMAINING ACCESS TIME
    REMAINING BACKUP DATA SIZE / DATA SIZE FOR 1 ACCESS
    ⇒1024 ACCESSES
S39:OBTAIN TIME REQUIRED FOR 1 ACCESS
    1MB / (WRITE PERFORMANCE × 4 / 4)
    ⇒4ms
S40:OBTAIN TIME ALLOWED FOR 1 ACCESS
    (REMAINING FEED DURATION - P-OFF SEQ LENGTH) / REMAINING ACCESS TIME
    ⇒ (50 SECONDS - 1 SECOND) / 1024 ACCESSES
    ⇒47ms
S41:DETERMINE WRITE MAXIMUM RETRY COUNT ALLOWED FOR 1 ACCESS
    TIME ALLOWED FOR RETRY / TIME REQUIRED FOR 1 TRANSFER
    ⇒47ms/4ms
    ⇒11 TIMES
```

FIG. 9

| ADDRESS | PRIORITY | COMPLETION FLAG |
|---|---|---|
| 0 | 0 | 0 |
| 1 | 1 | 0 |
| 2 | 2 | 0 |
| 3 | 1 | 0 |
| ⋮ | ⋮ | ⋮ |
| 8190 | 0 | 0 |
| 8191 | 2 | 0 |

CALCULATION RESULTS FOR THE FOLLOWING EXAMPLE:
TOTAL FEED DURATION IS 80 SECONDS
WRITE PERFORMANCE = 250 MB/s
1SIZE OF 1 ACCESS = 1 MB
LINK COUNT = PCIe LANE ×4
TOTAL BACKUP SIZE = 8 GB
PREVIOUS P-OFF SEQ = 1 SECOND
X = 50% OF MAXIMUM RETRY COUNT FOR LOW PRIORITY DATA
IS USED FOR HIGH PRIORITY DATA
-------------------------
7 GB DATA HAS BEEN TRANSFERRED (30 SECONDS ELAPSED)
REMAINING FEED DURATION = 50 SECONDS
ACCESS TIME FOR REMAINING HIGH PRIORITY DATA = 100 ACCESSES
ACCESS TIME FOR REMAINING LOW PRIORITY DATA = 200 ACCESSES
WRITE ERROR OCCURS
-------------------------
S87:OBTAIN REMAINING BACKUP DATA SIZE
    TOTAL BACKUP DATA SIZE - TRANSFERRED DATA SIZE
    ⇒1GB
S88:OBTAIN REMAINING ACCESS TIME
    REMAINING BACKUP DATA SIZE / DATA SIZE FOR 1 ACCESS
    ⇒1024 ACCESSES
S89:OBTAIN TIME REQUIRED FOR 1 ACCESS
    1 MB / (WRITE PERFORMANCE × 4 / 4)
    ⇒4ms
S90:OBTAIN TIME ALLOWED FOR 1 ACCESS
    (REMAINING FEED DURATION - P-OFF SEQ LENGTH) / REMAINING ACCESS TIME
    ⇒(50 SECONDS - 1 SECOND) / 1024 ACCESSES
    ⇒47ms
S91:DETERMINE WRITE MAXIMUM RETRY COUNT ALLOWED FOR 1 ACCESS
    TIME ALLOWED FOR RETRY / TIME REQUIRED FOR 1 TRANSER
    ⇒47ms/4ms
    ⇒11 TIMES (RETRY COUNT FOR NORMAL DATA)
S93~S96:DETERMINE WRITE MAXIMUM RETRY COUNTS BASED ON PRIORITIES
    • SUBTRACTION SUB TO BE SUBTRACTED FROM LOW PRIORITY DATA
      11 TIMES (50/100) => 5.5 TIMES (FRACTION IS ROUNDED DOWN)
    • MAXIMUM RETRY COUNT FOR LOW PRIORITY DATA
      11 TIMES - 5 TIMES => 6 TIMES
    • ADDITION ADD TO BE ADDED FOR HIGH PRIORITY DATA
      (5 TIMES × 200 ACCESS) / 100 ACCESS => 10 TIMES
    • MAXIMUM RETRY COUNT FOR HIGH PRIORITY DATA
      11 TIMES + 10 TIMES => 21 TIMES

CONTROL APPARATUS, COMPUTER-READABLE STORAGE MEDIUM, AND INFORMATION PROCESSING APPARATUS

CROSS-REFERENCE TO RELATED APPLICATION

This application is based upon and claims the benefit of priority of the prior Japanese Patent application No. 2013-259221, filed on Dec. 16, 2013, the entire contents of which are incorporated herein by reference.

FIELD

The embodiments discussed herein are related to a control apparatus, a non-transitory computer-readable storage medium storing a program, and an information processing apparatus.

BACKGROUND

When a power failure occurs, an information processing apparatus, such as a control module (CM), provided in a storage apparatus evacuates data in a cache memory that is under the control of a central processing unit (CPU), to a nonvolatile memory, using power from an interruption power supply unit, known as a system capacitor unit (SCU). After the information processing apparatus is started again, the data that has been evacuated (backed up) in the nonvolatile memory is restored to the cache memory and processing in the information processing apparatus is resumed. As used herein, any events where supply of power to the information processing apparatus is interrupted, such as a power failure, are collectively referred to as a "power failure".

Although NAND flush memory cache memory devices have been traditionally used as the destinations to back up data, solid state drives (SSDs) compliant with the Serial Advanced Technology Attachment (SATA) standard (hereinafter, referred to SATA-SSDs) have become widely used.

Before power to a SATA-SSD is shut down, a power-off (P-OFF) sequence (SEQ) must be executed on that SATA-SSD, by executing commands, such as Standby, Standby Immediate, and Sleep. If the power is shut down without executing a power-off sequence, an exceptional power-off may arise, resulting in a failure of the SATA-SSD. Specifically, the Standby command is executed for placing a SATA-SSD into the standby mode, whereas the Standby Immediate command is executed for immediately placing a SATA-SSD into the standby mode. The Sleep command is executed for placing a SATA-SSD into the sleep mode. These commands and a power-off sequence are well-known in the ATA technologies, and their detailed description is thus omitted.

FIG. 14 is a diagram illustrating a configuration of a conventional information processing apparatus 101.

An information processing apparatus 101 includes a CPU 102, a memory controller 103, a cache memory 104, a power supply 105, an interruption power supply 106, a backup control unit 107, and a SATA-SSD 108.

The CPU 102 is a processing apparatus that performs various types of controls and computations, and embodies various functions by executing an operating system (OS) and programs.

The memory controller 103 controls transfers of data, between the CPU 102 and the cache memory 104, between the CPU 102 and the backup control unit 107, and between the cache memory 104 and the backup control unit 107.

The cache memory 104 is a memory with a higher access rate which temporarily stores data (user data) to be read from or written to the CPU 102. The cache memory 104 is generally provided within the CPU 102.

The SATA-SSD 108 is the destination memory to which data stored in the cache memory 104 is to be backed up upon a power failure. Hereinafter, the SATA-SSD 108 may also be simply referred to as the SSD 108.

The power supply 105 is a power supply that receives external AC power, and supplies DC power to the CPU 102, the memory controller 103, the cache memory 104, the interruption power supply 106, the backup control unit 107, and the SSD 108.

The interruption power supply 106 is an SCU including a capacitor 114. The interruption power supply 106 receives the DC power from the power supply 105, and accumulates the power in a capacitor 114. Upon a power failure, the interruption power supply 106 supplies the DC power accumulated in the capacitor 114, to the memory controller 103, the cache memory 104, the backup control unit 107, and the SSD 108.

The backup control unit 107 controls to back up data stored in the cache memory 104 to the SSD 108, upon a power failure, using DC power supplied from the interruption power supply 106.

The backup control unit 107 includes a Peripheral Component Interconnect Express (PCIe) interface (IF) control unit 121, a SATA IF unit 122, a non-data DMA unit 123, a write DMA unit 124, and a power failure sequence (SEQ) unit 125.

In the information processing apparatus 101, the memory controller 103 and the backup control unit 107 are connected via a PCIe link 111 which contains four lanes. Through the PCIe link 111, user data to be backed up from the cache memory 104 to the SSD 108 is sent from the cache memory 104 to the backup control unit 107 via the memory controller 103.

The backup control unit 107 is also connected to the SSD 108 via a SATA link 112. Through the SATA link 112, user data to be backed up from the cache memory 104 to the SSD 108 is sent from the backup control unit 107 to the SSD 108.

The PCIe IF control unit 121 is a processing unit that controls communications between the memory controller 103 and the backup control unit 107 through the PCIe link 111 in the information processing apparatus 101.

The SATA IF unit 122 is a processing unit that controls communications between the backup control unit 107 and the SSD 108 through the SATA link 112.

The non-data DMA unit 123 is a processing unit that transfers non-data, such as commands, between the memory controller 103 and the SSD 108. For example, the non-data DMA unit 123 instructs the SSD 108 to execute Standby Immediate such that a power-off sequence is executed after a write of backup data into the SSD 108 is completed.

The write DMA unit 124 is a processing unit that controls a write of user data between the memory controller 103 and the SSD 108, by means of direct memory access. For example, the write DMA unit 124 writes data to be backed up from the cache memory 104 to the SSD 108, from the cache memory 104 to the SSD 108 via the memory controller 103.

The power-off sequence unit 125 executes a power failure sequence, when a power failure to the information processing apparatus 101 arises.

The interruption power supply 106 supplies power throughout the lifetime (e.g., five years) of an information processing apparatus where data to be backed up, which might be considered as sufficient. However, since the time duration during which the capacitor 114 can supply power is gradually shortened due to aging, the capacity of the capacitor 114 upon a factory shipment of the information processing apparatus 101 is selected such that the capacitor 114 can supply power in a time duration which substantially equals twice the length of a power failure process, at the end of the lifetime of the information processing apparatus 101.

Hence, in several years after the information processing apparatus 101 was shipped from the factory, the interruption power supply 106 can supply sufficient power when a power failure arises. Accordingly, when a write error occurs in the SSD 108 while data is being backed up from the cache memory 104 to the SSD 108, data can be backed up in a reliable manner with the power from the interruption power supply 106.

Conventionally, the information processing apparatus 101 has a fixed maximum error retry count (e.g., 8) for writing backup data from the cache memory 104 to the SSD 108. Accordingly, power accumulated in the interruption power supply 106 may not be utilized for retrying to write backup data beyond the fixed maximum retry count. This means that power accumulated in the capacitor 114 may not be fully harnessed for more retries to write backup data when the interruption power supply 106 is not old.

On the contrary, as described above, shutting down of power supply to an SSD 108 without executing a power-off sequence may lead to an unexpected power-off, resulting in a failure of the SSD 108. Even in a fortunate case where the SSD 108 is not failed, the SSD 108 may experience an abnormally extended startup time or a first write to the SSD 108 may take an abnormally long time, after the information processing apparatus 101 is powered on.

For example, a power-on (P-ON) of an SSD 108 after such an unexpected power-off may be 100 times or more longer than a normal power-on time of the SSD 108. Additionally, time for a first write to the SSD 108 may be abnormally extended to several dozens of seconds, as oppose to several hundred milliseconds of normal write time.

As described above, since aging of the capacitor 114 in the interruption power supply 106 shortens the power feed duration of the capacitor 114, when a power failure arises, power from an old interruption power supply 106 may be used up during a write retry of backup data. In such a case, power supply to the SSD 108 is shut down before a power-off sequence is executed on the SSD 108. As described above, this may lead to an unexpected power-off of the SSD 108, resulting in a failure of the SSD 108.

Accordingly, in an information processing apparatus, improving the reliability of the information processing apparatus by appropriating adjusting a maximum retry count for a backup of data to a SATA-SSD is desirable.

SUMMARY

Accordingly, a control apparatus is provided, that causes data in a first storage unit to be written in a second storage unit, with power supplied from a sub power supply, when supply of power from a main power supply is discontinued, the control apparatus including a remaining feed duration obtaining unit that obtains remaining feed duration during which the sub power supply can supply the power; and a retry count setting unit that sets a maximum retry count for writing the data from the first storage unit to the second storage unit, based on the remaining feed duration obtained by the remaining feed duration obtaining unit, when an error occurs while the data is being written.

Further, a non-transitory computer-readable recording medium storing a program for causing data in a first storage unit to be written in a second storage unit, with power supplied from a sub power supply, when supply of power from a main power supply is discontinued, is provided, the program causing a computer to: obtain remaining feed duration during which the sub power supply can supply the power; and set a maximum retry count for writing the data from the first storage unit to the second storage unit, based on the obtained remaining feed duration, when an error occurs while the data is being written.

Further, an information processing apparatus is provided, including: a main power supply; a sub power supply; a first storage unit; a second storage unit; and a control apparatus that causes data in the first storage unit to be written in the second storage unit, with power supplied from the sub power supply, when supply of power from the main power supply is discontinued, the control apparatus including: a remaining feed duration obtaining unit that obtains remaining feed duration during which the sub power supply can supply the power; and a retry count setting unit that sets a maximum retry count for writing the data from the first storage unit to the second storage unit, based on the remaining feed duration obtained by the remaining feed duration obtaining unit, when an error occurs while the data is being written.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 lists exemplary calculations by the power-off sequence unit as an example of the first embodiment;

FIG. 9 is a diagram illustrating an exemplary priority table as an example of the second embodiment;

FIG. 13 lists exemplary calculations of maximum retry counts by the power-off sequence unit as an example of the second embodiment.

DESCRIPTION OF THE PREFERRED EMBODIMENTS

A control apparatus, a method, a non-transitory computer-readable storage medium storing a program, and an information processing apparatus, as an example of embodiments, will be described with reference to the drawings.

Note that the embodiments discussed herein are merely exemplary, and it is not intended that various modifications and applications of the teachings not explicitly described are not omitted. In other words, the embodiments may be modified, within the scope of the spirit of the embodiments (such as combinations of embodiments and modifications).

(A) First Embodiment

A configuration of an example of the first embodiment information processing apparatus 1 will be described.

Figure 1:
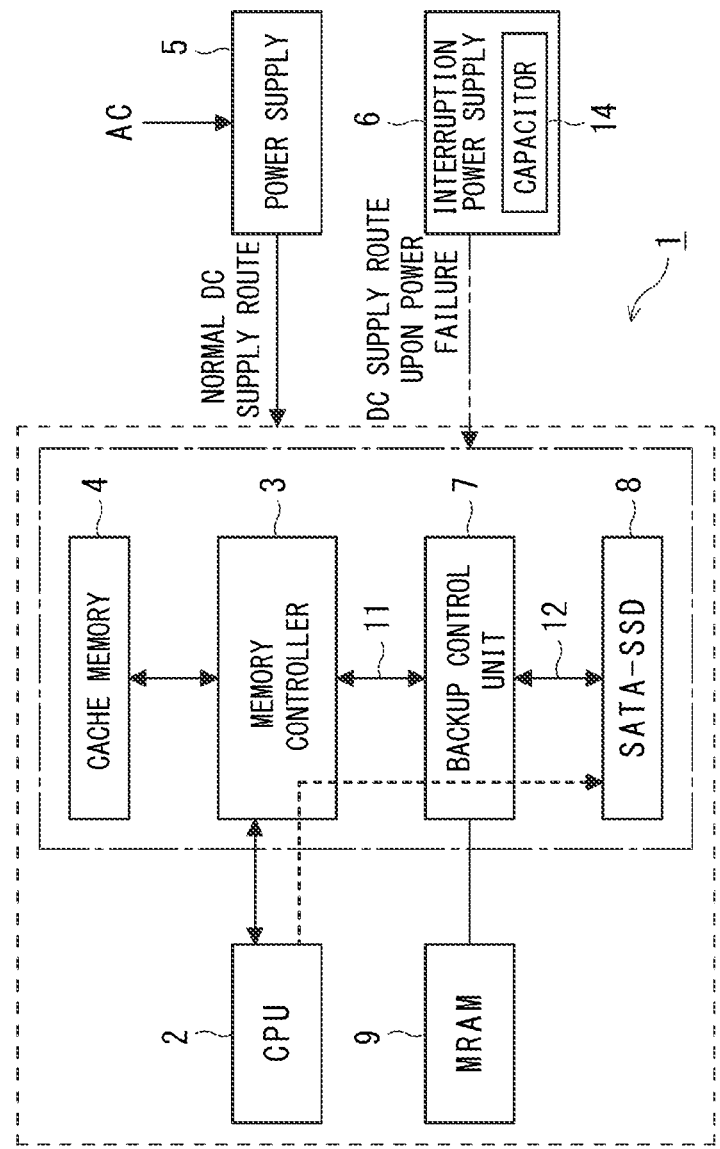
FIG. 1 is a diagram illustrating a hardware configuration of an information processing apparatus as an example of embodiments.

FIG. 1 is a diagram illustrating a hardware configuration of an information processing apparatus 1 as an example of embodiments.

The information processing apparatus 1 is a storage control apparatus (control module, CM) provided in a storage apparatus (not illustrated), for example.

The information processing apparatus 1 includes a CPU 2, a memory controller 3, a cache memory (first storage unit) 4, a power supply (main power supply) 5, an interruption power supply (sub power supply) 6, a backup control unit (control apparatus, computer) 7, a SATA-SSD (second storage unit) 8, and a magneto-resistive random access memory (MRAM) 9.

The CPU 2 is a processing apparatus that performs various types of controls and computations, and embodies various functions by executing an OS and programs stored in the MRAM 9 and the like. The CPU 2 may be embodied using any of well-known CPUs, for example.

The memory controller 3 controls transfers of data, between the CPU 2 and the cache memory 4, between the CPU 2 and the backup control unit 7, and between the cache memory 4 and the backup control unit 7.

The cache memory 4 is a memory with a higher access rate which temporarily stores data (user data) to be read from or written to the CPU 2. The cache memory 4 is generally provided within the CPU 2. Any of well-known static random access memory (SRAM) devices may be used as the cache memory 4, for example.

The SATA-SSD 8 is the destination memory to which data stored in the cache memory 4 is to be backed up upon a power failure. Any of well-known SATA-SSD may be used as the SATA-SSD 8. For the sake of the brevity of descriptions, the SATA-SSD 8 may also be simply referred to as the SSD 8. As used herein, any events where supply of power to the information processing apparatus 1 is interrupted, such as a power failure, are collectively referred to as a "power failure".

Figure 2:
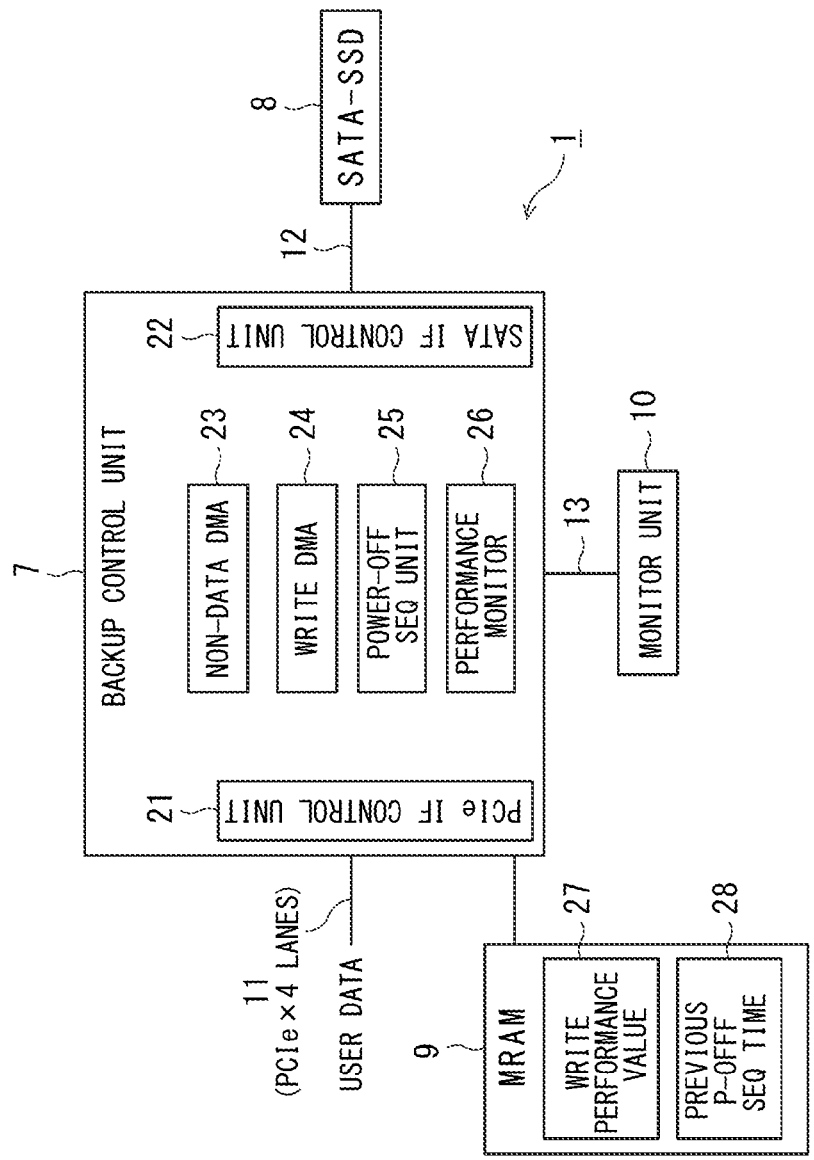
FIG. 2 is a diagram illustrating a configuration of a backup control unit as an example of a first embodiment.

The power supply 5 is a power supply that receives external AC power, and supplies DC power to the CPU 2, the memory controller 3, the cache memory 4, the interruption power supply 6, the backup control unit 7, the SSD 8, the MRAM 9, and a monitor unit 10 (refer to FIG. 2).

The interruption power supply 6 is an SCU including a capacitor 14. The interruption power supply 6 receives the DC power from the power supply 5, and accumulates the power in a capacitor 14. Upon a power failure, the interruption power supply 6 supplies the DC power accumulated in the capacitor 14, to the memory controller 3, the cache memory 4, the backup control unit 7, the SSD 8, the MRAM 9, and the monitor unit 10.

The capacitor 14 is a capacitor for accumulating the DC power supplied from the power supply 5. As the capacitor 14 degrades due to aging, the time duration during which the capacitor 14 can supply power (feed duration of the capacitor 14) shortens with usage of the capacitor 14. Upon a factory shipment of the information processing apparatus 1, the capacitor 14 can actually supply power in a time duration which substantially equals twice the lengths for backup of data in the cache memory 4 and for a power-off sequence on the SSD 8, throughout the lifetime (e.g., five years) of the information processing apparatus 1. As used herein, a backup of data in the cache memory 4 and a power-off sequence on the SSD 8 are collectively referred to as a "power failure process".

The backup control unit 7 is a field-programmable gate array (FPGA) that performs a power failure process upon a power failure. Specifically, the backup control unit 7 backs up data stored in the cache memory 4 to the SSD 8, and then executes a power-off sequence on the SSD 8, using DC power supplied from the interruption power supply 6. In this first embodiment, for backup to the SSD 8 upon a power failure, the backup control unit 7 determines a maximum retry count for retrying write upon a write error, based on the feed duration which may be shortened due to aging of the capacitor 14 in the interruption power supply 6 and a performance value. The detailed configuration and functions of the backup control unit 7 will be described later with reference to FIG. 2.

The MRAM 9 is a nonvolatile memory utilizing magnetic storage elements, and is used for keeping various types of data used for administrations even after power supply to the information processing apparatus 1 is discontinued. In this embodiment, the MRAM 9 is used to store a write performance value 27 and a previous SSD P-OFF SEQ length 28, the SSD 8 (refer to FIG. 2).

In the information processing apparatus 1, the memory controller 3 and the backup control unit 7 are connected via a PCIe link 11 which contains four lanes. Through the PCIe link 11, user data to be backed up from the cache memory 4 to the SSD 8 is sent from the cache memory 4 to the backup control unit 7 via the memory controller 3.

The backup control unit 7 is also connected to the SSD 8 via a SATA link 12. Through the SATA link 12, user data to be backed up from the cache memory 4 to the SSD 8 is sent from the backup control unit 7 to the SSD 8.

FIG. 2 is a diagram illustrating a configuration of the backup control unit 7 as an example of a first embodiment.

The backup control unit 7 includes a PCIe IF control unit 21, a SATA IF unit 22, a non-data DMA unit 23, a write DMA unit 24, a power failure sequence (SEQ) unit (retry count setting unit) 25, and a performance monitor (remaining feed duration obtaining unit, recording unit) 26.

The backup control unit 7 is also connected to the monitor unit 10 via a link 13.

The monitor unit 10 is an FPGA that monitors and controls the power supply 5 and the interruption power supply 6 in the information processing apparatus 1. In this embodiment, the monitor unit 10 monitors the time duration during which the capacitor 14 in the interruption power supply 6 can supply power upon a power failure.

The PCIe IF control unit 21 is a processing unit that controls communications between the memory controller 3 and the backup control unit 7 through the PCIe link 11. The PCIe IF control unit 21 may be embodied as a circuit, for example.

The SATA IF unit 22 is a processing unit that controls communications between the backup control unit 7 and the SSD 8 through the SATA link 12. The SATA IF unit 22 may be embodied as a circuit, for example.

The non-data DMA unit 23 is a processing unit that transfers non-data, such as commands, between the memory controller 3 and the SSD 8. For example, the non-data DMA unit 23 instructs the SSD 8 to execute Standby Immediate such that a power-off sequence is executed after a write of backup data into the SSD 8 is completed. The non-data DMA unit 23 may be embodied as a circuit, for example.

The write DMA unit 24 is a processing unit that controls a write of user data between the memory controller 3 and the SSD 8, by means of direct memory access. For example, the write DMA unit 24 writes data to be backed up from the cache memory 4 to the SSD 8, from the cache memory 4 to the SSD 8 via the memory controller 3. The write DMA unit 24 may be embodied as a circuit, for example.

The performance monitor 26 is a processing unit that monitors various types of information related to power failure processes. The performance monitor 26 is started by the CPU 2 when a power failure to the information processing apparatus 1 arises.

Specifically, in response to being started by the CPU 2, the performance monitor 26 starts counting up the elapsed time since the power failure arises. The power-off sequence unit 25 starts the write DMA unit 24. The performance monitor 26 checks how many lanes are currently available among all lanes (four lanes, in the example in FIG. 2) in the PCIe link 11.

Further, when a power failure process is completed successfully in the information processing apparatus 1, the performance monitor 26 calculates a write performance value (e.g., MB/s), from the time that was spent for the backup from the cache memory 4 to the SSD 8 and the size of data that was backed up. The performance monitor 26 then records the calculated write performance value in the MRAM 9, as a write performance value 27. The write performance value 27 will be used by the power-off sequence unit 25 for calculating a maximum retry count in future, when a subsequent power failure arises.

The performance monitor 26 determines the time that is spent for the power-off sequence on the SSD 8, and records it into the MRAM 9, as a previous SSD P-OFF SEQ length 28. The previous SSD P-OFF SEQ length 28 will also be used by the power-off sequence unit 25 for calculating a maximum retry count.

The performance monitor 26 may be embodied as a circuit, for example.

The power-off sequence unit 25 executes a power failure sequence, when a power failure to the information processing apparatus 1 arises. For the power failure sequence, the power-off sequence unit 25 executes a retry count calculation which will be described later with reference to FIG. 6 to set a maximum retry count in the case of a write error of data to be backed up from the cache memory 4 to the SSD 8. Specifically, the power-off sequence unit 25 receives a time duration during which the capacitor 14 can supply power (remaining feed duration of the capacitor 14), from the monitor unit 10, and calculates how many times a write to the SSD 8 can be retried, while reserving time sufficient to execute a power-off sequence on the SSD 8.

Now, with reference to FIG. 3, a power failure process executed upon a power failure to the information processing apparatus 1 executed will be described.

Figure 3:
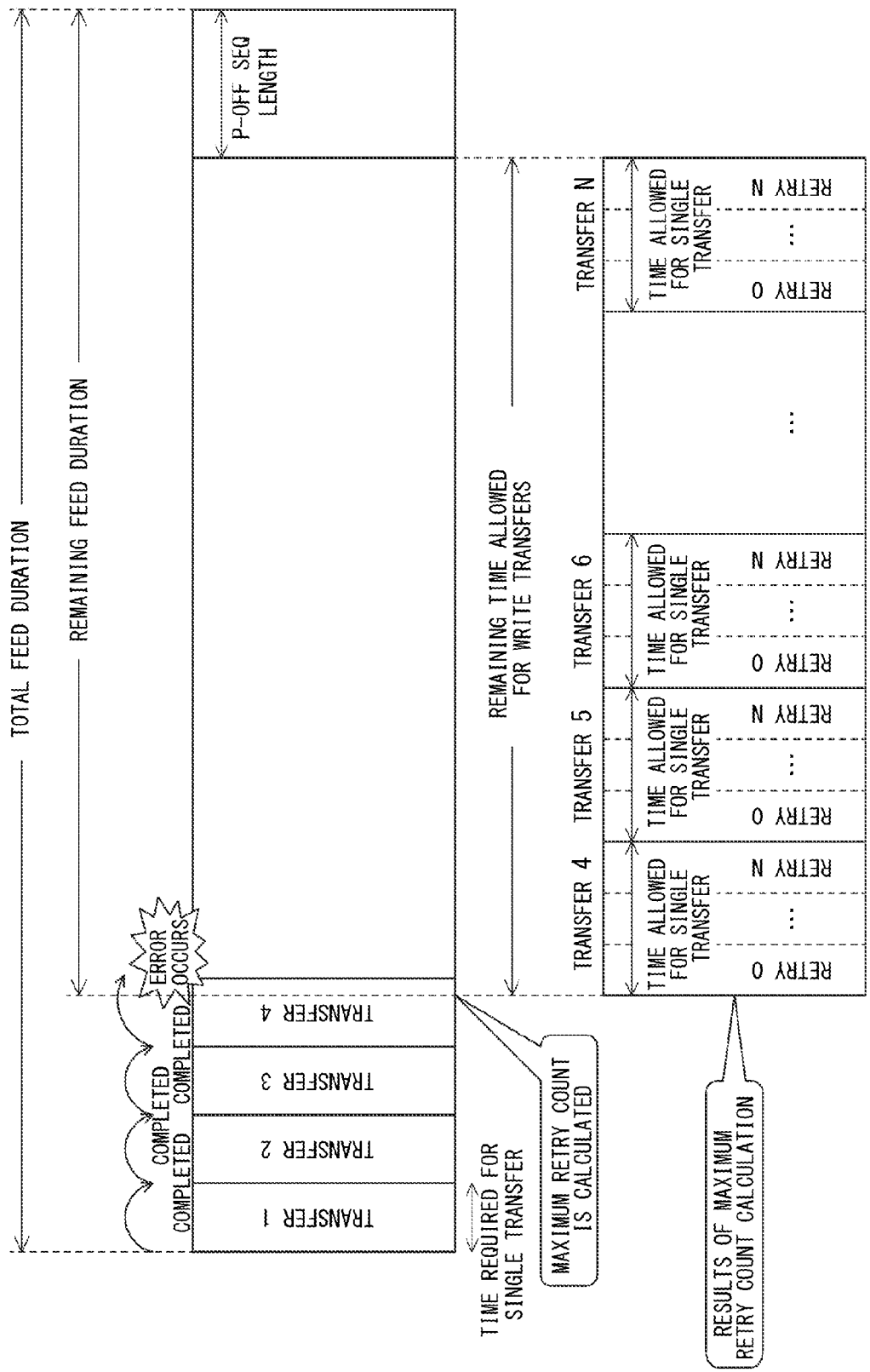
FIG. 3 is a diagram illustrating a power failure process by the information processing apparatus as an example of the first embodiment.

FIG. 3 is a diagram illustrating a power failure process by the information processing apparatus 1 as an example of the first embodiment.

Generally, when data is transferred within the information processing apparatus 1, for transferring large-sized data, the data is divided into multiple chunks and a data transfer is performed each of the divided chunks. Of course, backup of larger data from the cache memory 4 to the SSD 8 upon a power failure is also performed in multiple smaller data chunks. Here, a backup of a single data chunk is from the cache memory 4 to the SSD 8 is referred to as a single (1) access or a single (1) transfer.

As described above, when a power failure to the information processing apparatus 1 arises, backup of data from the cache memory 4 to the SSD 8 is performed in multiple accesses (transfers). In the example in FIG. 3, after three data transfers (Transfer 1 to Transfer 3) were completed, an error occurs during the fourth data transfer (Transfer 4).

When the error occurs, the power-off sequence unit 25 executes a retry count calculation which will be described later with reference to FIG. 6, to calculate a maximum retry count for a single transfer, from the length of time spent for the previous power-off sequence on the SSD 8 and the time available for a single transfer. Specifically, the power-off sequence unit 25 calculates the maximum retry count such that sufficient time is left for a power-off sequence on the SSD 8.

The power-off sequence unit 25 executes such a retry count calculation, every time an error occurs during a transfer of backup data.

Figure 4:
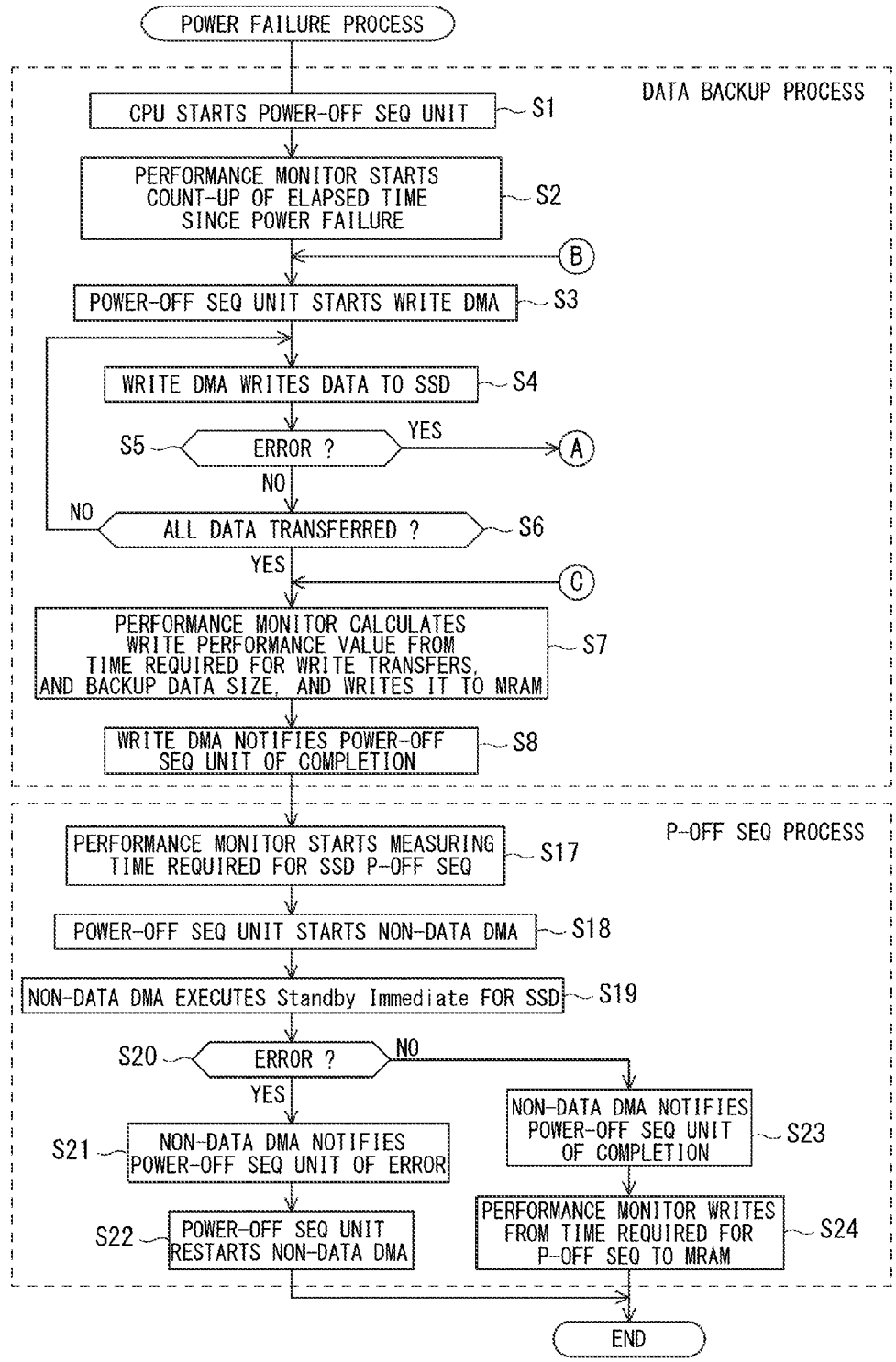
FIGS. 4 and 5 are flowcharts illustrating a power failure process in the information processing apparatus as an example of the first embodiment.
Figure 5:
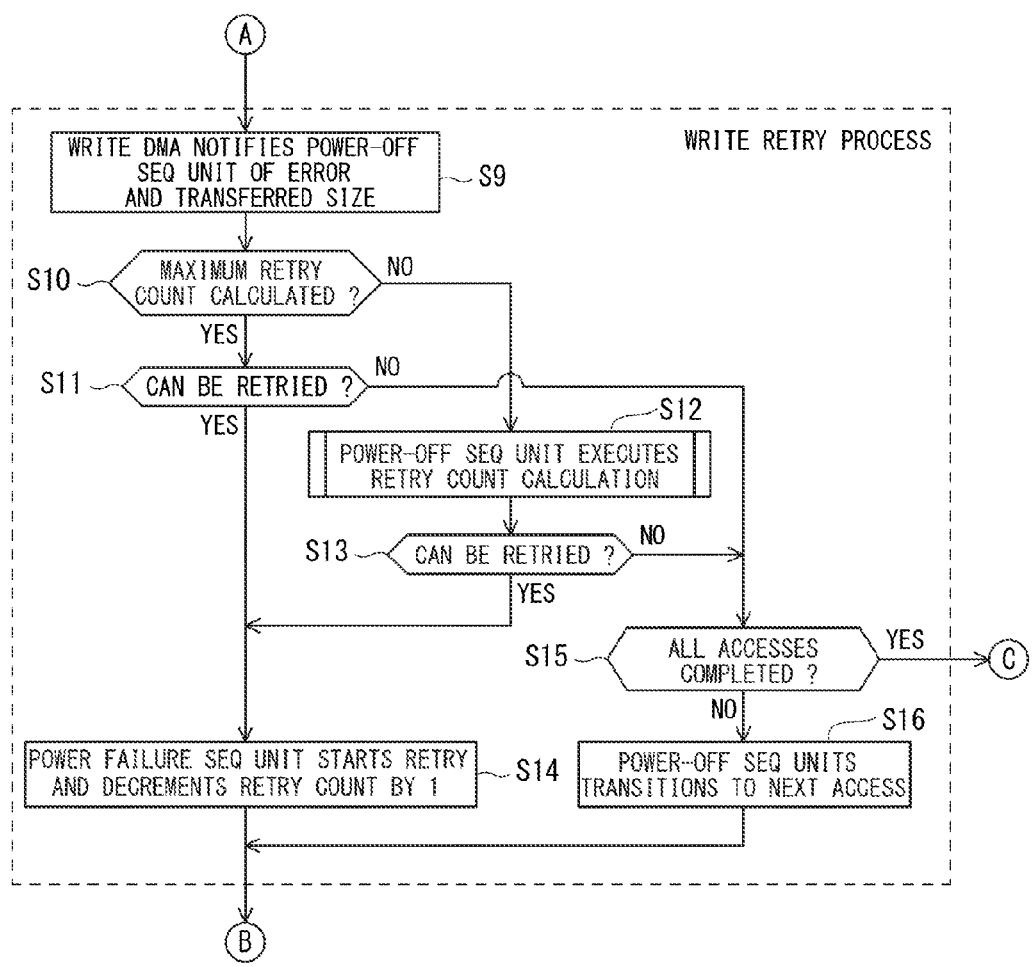

FIGS. 4 and 5 are flowcharts illustrating a power failure process in the information processing apparatus 1 as an example of the first embodiment (Steps S1 to S24). FIG. 4 includes Steps S1 to S8, S17 to S24, while FIG. 5 includes Steps S9 to S16.

When supply of AC power to the power supply 5 is discontinued in the information processing apparatus 1, due to a power failure and the like, in Step S1, the CPU 2 sets the size and the address of data to be backed up from the cache memory 4 to the SSD 8, and starts the power-off sequence unit 25. The CPU 2 then transitions to the sleep state for conserving power, until the information processing apparatus 1 is restarted.

Next, in Step S2, the performance monitor 26 started in Step S1 starts counting up the elapsed time since the power failure arises. The performance monitor 26 also checks (determines) how many lanes are currently available among all lanes in the PCIe link 11.

Next, in Step S3, the power-off sequence unit 25 starts the write DMA unit 24.

In Step S4, the write DMA unit 24 writes data to be backed up from the cache memory 4, to the SSD 8.

In Step S5, the write DMA unit 24 determines whether or not an error occurs during any write of the data to be backed up.

If no error occurs (refer to the NO route from Step S5), in Step S6, the write DMA unit 24 determines whether or not the entire data to be backed up from the cache memory 4 has been transferred to the SSD 8. Upon this determination, for example, the write DMA unit 24 compares the size of the entire data to be backed up (total backup data size), against the size of data that has already been transferred to the SSD 8 (transferred data size).

If the entire data has not been transferred yet (refer to the NO route from Step S6), the write DMA unit 24 returns to Step S4 and continue to transfer the data.

Otherwise, if the entire data has been transferred (refer to the YES route from Step S6), in Step S7, the performance monitor 26 calculates a write performance value, from the cache memory 4 to the SSD 8 the time spent for the write transfer and the total size of backed-up data in Step S4. The performance monitor 26 then records the calculated write performance value 27 in the MRAM 9.

Next, in Step S8, the write DMA unit 24 notifies the power-off sequence unit 25 of the completion of the transfer of the backup data.

Otherwise, if an error occurs in Step S5 (refer to the YES route from Step S5), a write retry process is initiated. Specifically, in Step S9 in FIG. 5, the write DMA unit 24 notifies the power-off sequence unit 25 of the error. Further, the write DMA unit 24 notifies the power-off sequence unit 25 of the size of data that has been transferred to the SSD 8 before the error occurs.

Next, in Step S10, the power-off sequence unit 25 determines whether or not the power-off sequence unit 25 has calculated a maximum retry count.

If a maximum retry count has been calculated (refer to the YES route from Step S10), in Step S11, the power-off sequence unit 25 determines whether or not a retry can be made (i.e., the maximum retry count is one or more).

If a retry can be made (refer to the YES route from Step S11), the flow moves to Step S14 which will be described later.

Otherwise, if no retry can be made (refer to the NO route from Step S11), in Step S15, the power-off sequence unit 25 determines whether or not all accesses have been completed (all transfers have been completed).

If not all of the accesses have been completed (refer to the NO route from Step S15), in Step S16, the power-off sequence unit 25 makes the next access (transfers the next chunk of data).

If all accesses have been completed (refer to the YES route from Step S15), the flow moves to the Step S7 described above.

Otherwise, if a maximum retry count has not been calculated in Step S10 (refer to the NO route from Step S10), in Step S12, the power-off sequence unit 25 executes a retry count calculation which will be described later with reference to FIG. 6.

Next, in Step S13, the power-off sequence unit 25 determines whether or not a retry can be made.

If no retry can be made (refer to the NO route from Step S13), the flow moves to the Step S15 described above.

Otherwise, if a retry can be made (refer to the YES route from Step S13), in Step S14, the power-off sequence unit 25 starts retrying to write data for which the error occurred in Step S4 in FIG. 4, and decrements the retry count by one (−1). Thereafter, the flow moves to Step S3 in FIG. 4 described above.

The data backup process has been completed. After the data backup process, a power-off sequence (P-OFF SEQ) on the SSD 8 is executed. First, in Step S17, the performance monitor 26 starts counting time being spent for the power-off sequence on the SSD 8.

Next, in Step S18, the power-off sequence unit 25 starts the non-data DMA unit 23.

In Step S19, the non-data DMA unit 23 executes the Standby Immediate command on the SSD 8 such that the SSD 8 executes a power-off sequence.

In Step S20, the power-off sequence unit 25 determines whether or not an error occurs in the Standby Immediate command.

If an error occurs (refer to the YES route from Step S20), in Step S21, the non-data DMA unit 23 notifies the power-off sequence unit 25 of the error of the Standby Immediate.

Next, in Step S22, the power-off sequence unit 25 restarts the non-data DMA unit 23, and terminates this flow.

Otherwise, if no error occurs in Step S20 (refer to the NO route from Step S20), in Step S23, the non-data DMA unit 23 notifies the power-off sequence unit 25 of the completion of the Standby Immediate.

In Step S24, the performance monitor 26 records the time spent for a power-off sequence on the SSD 8, in the MRAM 9 as the previous SSD P-OFF SEQ length 28, and terminates this flow.

Figure 6:
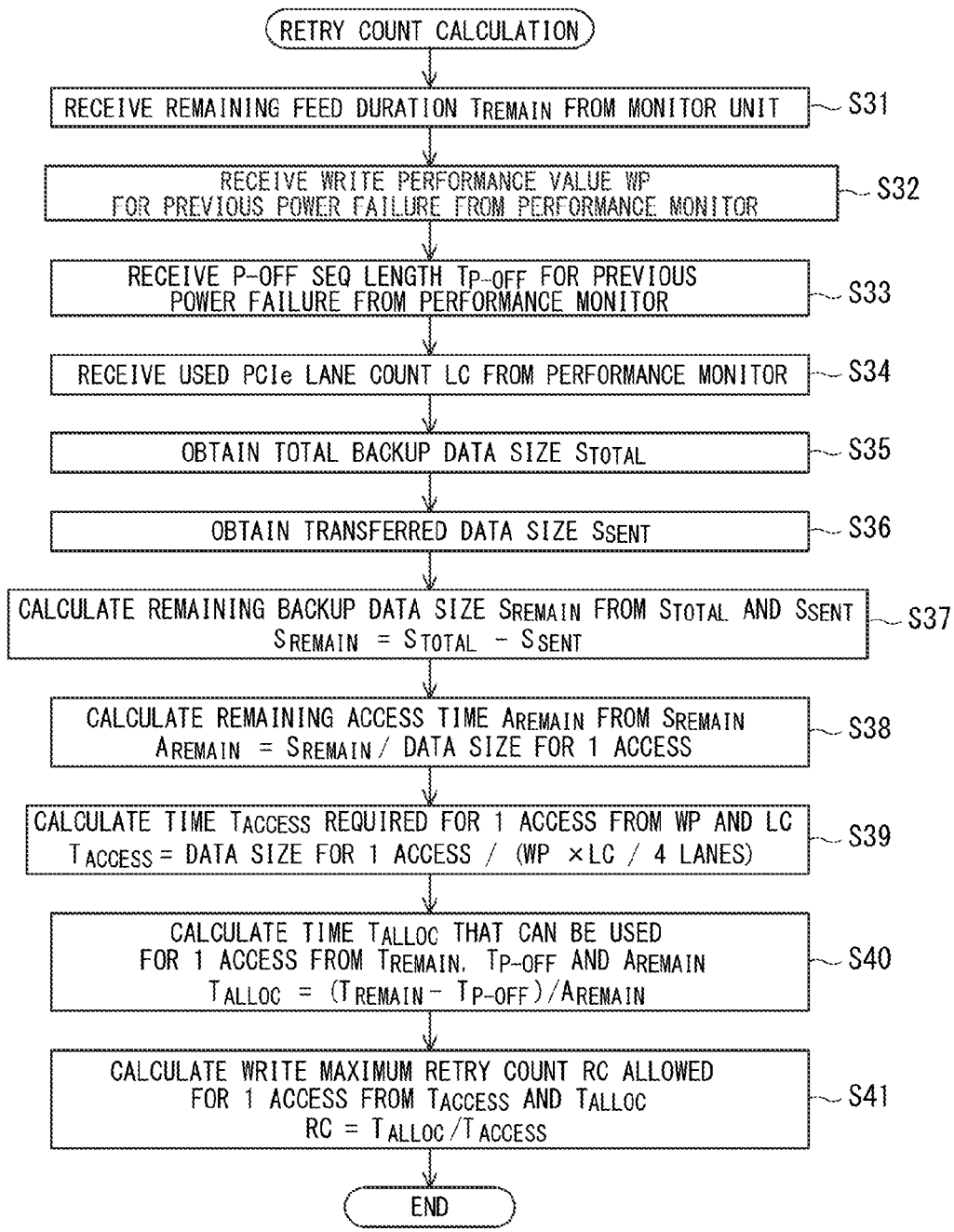
FIG. 6 is a flowchart illustrating a retry count calculation by a power-off sequence unit as an example of the first embodiment.

FIG. 6 is a flowchart illustrating a retry count calculation by the power-off sequence unit 25 as an example of the first embodiment (Steps S31 to S41).

In Step S31, the power-off sequence unit 25 receives, from the monitor unit 10, the remaining feed duration $T_{REMAIN}$ that is the time duration during which the capacitor 14 in the interruption power supply 6 can supply power.

In Step S32, the power-off sequence unit 25 receives, from the performance monitor 26, a write performance value 27 (WP) upon a previous power failure.

Next, in Step S33, the power-off sequence unit 25 requests, to the performance monitor 26, the power-off sequence time $T_{P\text{-}OFF}$ that was spent for a previous power-off sequence on the SSD 8, and receives it.

In Step S34, the power-off sequence unit 25 receives a count LC of PCIe lanes that are being used, from the performance monitor 26.

In Step S35, the power-off sequence unit 25 obtains the size $S_{TOTAL}$ of entire data to be backed up from the cache memory 4 to the SSD 8.

Next, in Step S36, the power-off sequence unit 25 obtains the size $S_{SENT}$ of data that has been transferred from the cache memory 4 to the SSD 8.

In Step S37, the power-off sequence unit 25 calculates, from the $S_{TOTAL}$ obtained in Step S35 and the $S_{SENT}$ in Step S36, the size $S_{REMAIN}$ of remaining backup data that is to be backed up to but has not been sent to the SSD 8 using the following Formula (1):

$$S_{REMAIN} = S_{TOTAL} - S_{SENT} \qquad (1)$$

In Step S38, the power-off sequence unit 25 calculates, from the $S_{REMAIN}$ obtained in Step S37, the remaining access time $A_{REMAIN}$, representing how many times the SSD 8 is to be accessed for backing up the remaining data, using the following Formula (2):

$$A_{REMAIN} = S_{REMAIN}/\text{data size of a single access} \qquad (2)$$

Next, in Step S39, the power-off sequence unit 25 calculates, from WP and LC obtained in Steps S32 and S34, time $T_{ACCESS}$ required for a single access, using the following Formula (3):

$$T_{ACCESS} = \text{data size of a single access}/(WP \times LC/\text{total lane count}) \qquad (3)$$

In Step S40, the power-off sequence unit 25 calculates, from the $T_{REMAIN}$ and the $T_{P\text{-}OFF}$ obtained in Steps S31 and S33, and the $A_{REMAIN}$ obtained in Step S38, time $T_{ALLOC}$ that is available for a single access, using the following Formula (4):

$$T_{ALLOC} = (T_{REMAIN} - T_{P\text{-}OFF})/A_{REMAIN} \quad (4)$$

In Step S41, the power-off sequence unit 25 calculates, from the $T_{ACCESS}$ obtained in Step S39 and the $T_{ALLOC}$ obtained in Step S40, a maximum write retry count RC for a single access using the following Formula (5), and terminates this flow:

$$RC = T_{ALLOC}/T_{ACCESS} \quad (5)$$

FIG. 7 lists exemplary calculations by the power-off sequence unit 25 as an example of the first embodiment.

In this example, the total feed duration of the capacitor 14 is 80 seconds, the write performance value WP is 250 MB/s, the data size of a single access is 1 MB, the used lane count LC among the entire PCIe lanes is four lanes, the total backup size $S_{TOTAL}$ is 8 GB, and the previous power-off sequence time $T_{P\text{-}OFF}$ is 1 second. In this case, after 30 seconds passes after the power failure (when the remaining feed duration is 50 seconds) and when 7 GB of data has been transferred, a write error occurs.

In Step S37 in FIG. 6, the power-off sequence unit 25 calculates the remaining backup data size $S_{REMAIN}$ as: $S_{REMAIN}$=total backup data size of 8 GB—transferred data size of 7 GB=1 GB.

Next, in Step S38, the power-off sequence unit 25 calculates the remaining access time $A_{REMAIN}$ as: remaining backup data size of 1 GB/data size of 1 MB per access=1024 accesses.

In Step S39, the power-off sequence unit 25 calculates the time $T_{ACCESS}$ required for a single access as follows: data size of a single access 1 MB/(write performance of 250 MB/s×link count of 4/4 lanes)=4 ms.

Next, in Step S40, the power-off sequence unit 25 calculates the time $T_{ALLOC}$ that is available for a single access as: (remaining feed duration of 50 seconds−power-off sequence time of 1 second)/remaining access time of 1024 accesses=47 ms.

In Step S41, the power-off sequence unit 25 calculates the write maximum retry count RC available for a single access as: time available for retry of 47 ms/time required for a single access of 4 ms=11 times.

As described above, in accordance with an example of the first embodiment, the power-off sequence unit 25 calculates a maximum retry count for a backup of data to the SSD 8 upon a write error, from the feed duration by the capacitor 14 in the interruption power supply 6, the length of a power-off sequence on the SSD 8, and the write performance value 27. As described above, the power-off sequence unit 25 calculates a write maximum error retry count while reserving sufficient time for executing a power-off sequence on the SSD 8, which can improve the possibility of successful completion of a power-off sequence on the SSD 8 upon a power failure. This can prevent an unexpected power-off of the SSD 8 and thus a failure of the SSD 8, and any extension of a startup time and a first write time of the SSD 8 may be avoided when the information processing apparatus 1 is started later.

Furthermore, the power-off sequence unit 25 sets a write maximum error retry count to a maximum value which can be achieved with the time duration during which the capacitor 14 in the interruption power supply 6 can supply power. Thus, the power accumulated in the capacitor 14 in the interruption power supply 6 can be fully harnessed, which helps to improve the reliability of the information processing apparatus 1.

Further, since the power-off sequence unit 25 calculates a write maximum error retry count considering how many lanes are available among all lanes in the PCIe link 11, the maximum retry count can be accurately calculated even when a part of the PCIe link 11 is not available.

(B) Second Embodiment

In the meantime, all data in an information processing apparatus rarely has equal importance, and an information processing apparatus typically contains data having a higher priority, as well as those with a lower priority. In such a case, assuring backup of data with a higher priority upon a power failure is desirable.

For this purpose, an information processing apparatus 1' as an example of a second embodiment includes a backup control unit 7,' in place of the backup control unit 7 of the above-described first embodiment. The backup control unit 7' calculates a maximum retry count in the same manner as the backup control unit 7, and determines maximum retry counts in accordance with priorities of data.

The information processing apparatus 1' as an example of the second embodiment has the similar hardware configuration as that of the information processing apparatus 1 as an example of the first embodiment depicted in FIG. 1, and a detailed description and illustration thereof are omitted.

Figure 8:
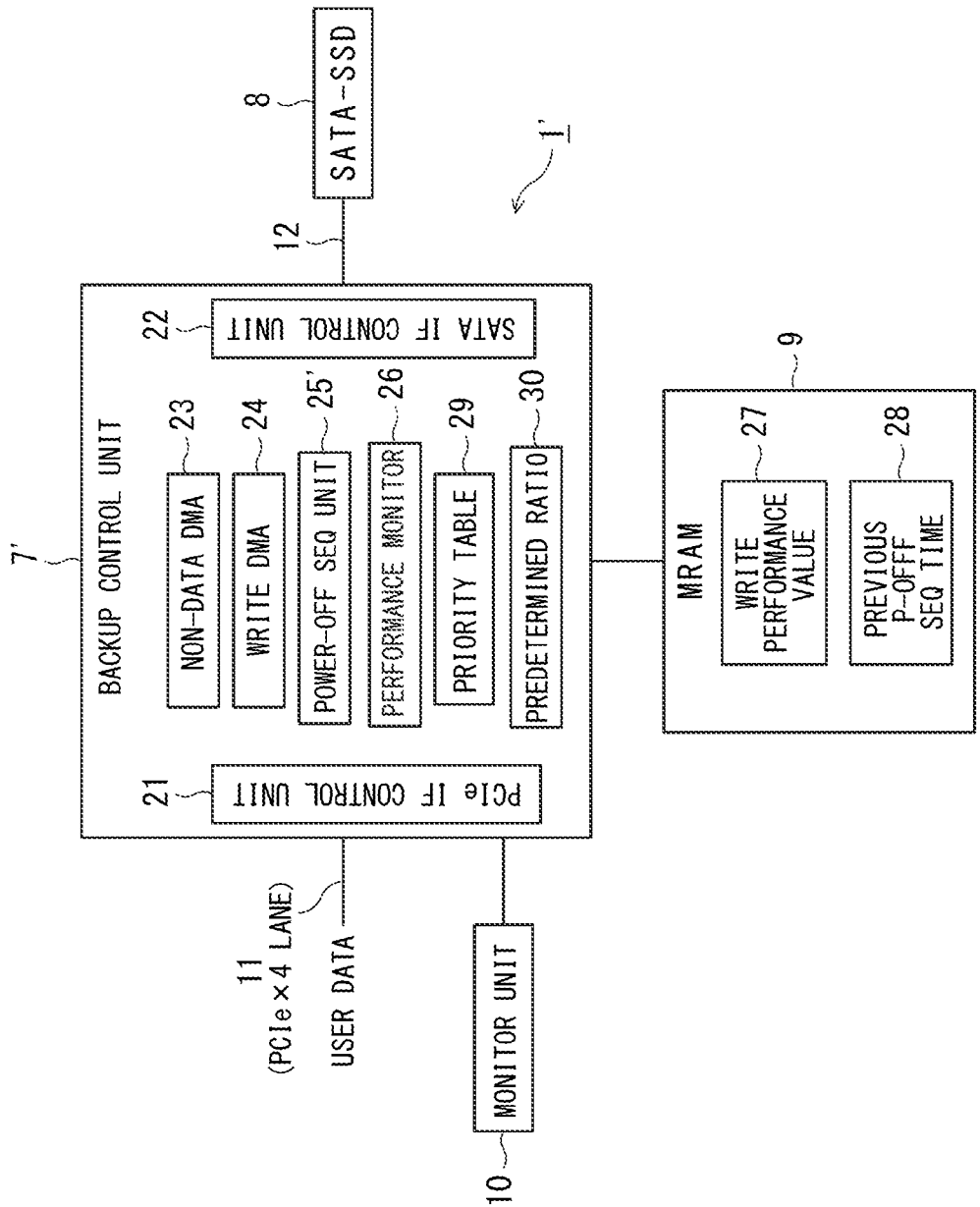
FIG. 8 is a diagram illustrating a configuration of a backup control unit as an example of a second embodiment.

FIG. 8 is a diagram illustrating a configuration of a backup control unit 7' as an example of a second embodiment.

The information processing apparatus 1' as an example of the second embodiment includes an MRAM 9 that stores a write performance value 27 and a previous SSD P-OFF SEQ length 28, a backup control unit 7', a SATA-SSD (hereinafter also referred to as SSD) 8, and a monitor unit 10.

The backup control unit 7' includes a PCIe IF control unit 21, a SATA IF unit 22, a non-data DMA unit 23, a write DMA unit 24, a power-off sequence unit 25', and a performance monitor 26.

In an example of this second embodiment, a priority table (priority information) 29 and a predetermined ratio 30 are stored in an internal memory (not illustrated) in the backup control unit 7' or the like. In an example of this second embodiment, the backup control unit 7' reads priority information stored in its internal memory (not illustrated), and then generates the priority table 29 in a table format, as an example in FIG. 9. In other words, the priority table 29 is actually not stored as a table in the internal memory. FIG. 8 illustrates how the priority table 29 is stored in the backup control unit 7'.

Alternatively, a priority table 29 may be stored in an internal memory in the backup control unit 7' in advance, which may be read as the priority table 29.

The MRAM 9, the SSD 8, the monitor unit 10, the PCIe IF control unit 21, the SATA IF unit 22, the non-data DMA unit 23, the write DMA unit 24, the performance monitor 26, the write performance value 27, and the previous SSD P-OFF SEQ length 28 in the information processing apparatus 1' as an example of the second embodiment have the similar functions and configurations as their counterparts in the example of the first embodiment described above, and a detailed description thereof is omitted.

The power-off sequence unit 25' executes a power failure sequence, when a power failure to the information processing apparatus 1' arises. For the power failure sequence, the power-off sequence unit 25' executes a retry count calculation which will be described later with reference to FIG. 12 to set a maximum retry count in the case of a write error of data to be backed up from the cache memory 4 to the SSD 8. Specifically, the power-off sequence unit 25' receives a time duration during which the capacitor 14 can supply power (remaining feed duration of the capacitor 14), from the monitor unit 10, and calculates how many times a write to the SSD 8 can be retried, while reserving time sufficient to execute a power-off sequence on the SSD 8.

The power-off sequence unit 25' then determines maximum retry counts in accordance with priorities of data, based on a predetermined ratio 30 (X %) and a priority table 29 that have been set by the CPU 2 and stored in the MRAM 9, in advance. The predetermined ratio 30 is the percentage of the value ADD to be added to the maximum retry count for normal-priority data to determine the maximum retry count for high-priority data, against the value SUB to be subtracted from the maximum retry count for normal-priority data to determine the maximum retry count for low-priority data.

For example, when X=50% and the value SUB to be subtracted from the maximum retry count for normal-priority data to determine the maximum retry count for low-priority data is 6, the value ADD to be added to the maximum retry count for normal-priority data to determine the maximum retry count for high-priority data is SUB×X %=6×50%=3. In this case, when the maximum retry count for normal-priority data is 10, the maximum retry count for low-priority data is 10−6=4 and the maximum retry count for high-priority data is 10+3=13.

The priority table 29 stores, for each address of data in the cache memory 4, a priority of the data and information indicating whether backup of the data is completed.

FIG. 9 is a diagram illustrating an exemplary priority table 29 as an example of the second embodiment.

The priority table 29 includes an address field 291, a priority field 292, and a completion flag field 293.

The address field 291 stores addresses of data in the cache memory 4. For example, the address field 291 stores addresses for each of 1-MB data in the cache memory 4, and data in the cache memory 4 is to be backed up in a unit of 1 MB during a power failure process that will be described later.

The priority field 292 stores values indicating priorities of data in the respective addresses of the cache memory 4. For example, the priority field 292 stores the value of 1 (high-priority), 2 (low-priority), or 3 (normal-priority).

The completion flag field 293 stores values indicating whether backup of the data from the cache memory 4 to the SSD 8 upon a power failure is completed. For example, the completion flag field 293 stores the value of 1 (already backed up) or 0 (not backed up yet).

Note that the information stored in the priority table 29 depicted in FIG. 9 represents priority information, and the information is related and is stored in an internal memory (not illustrated) in the backup control unit 7'. Although the priority information takes the form of the priority table 29 in an example of this second embodiment, the priority information is not necessarily a table and may be stored into the backup control unit 7' in other formats.

Figure 10:
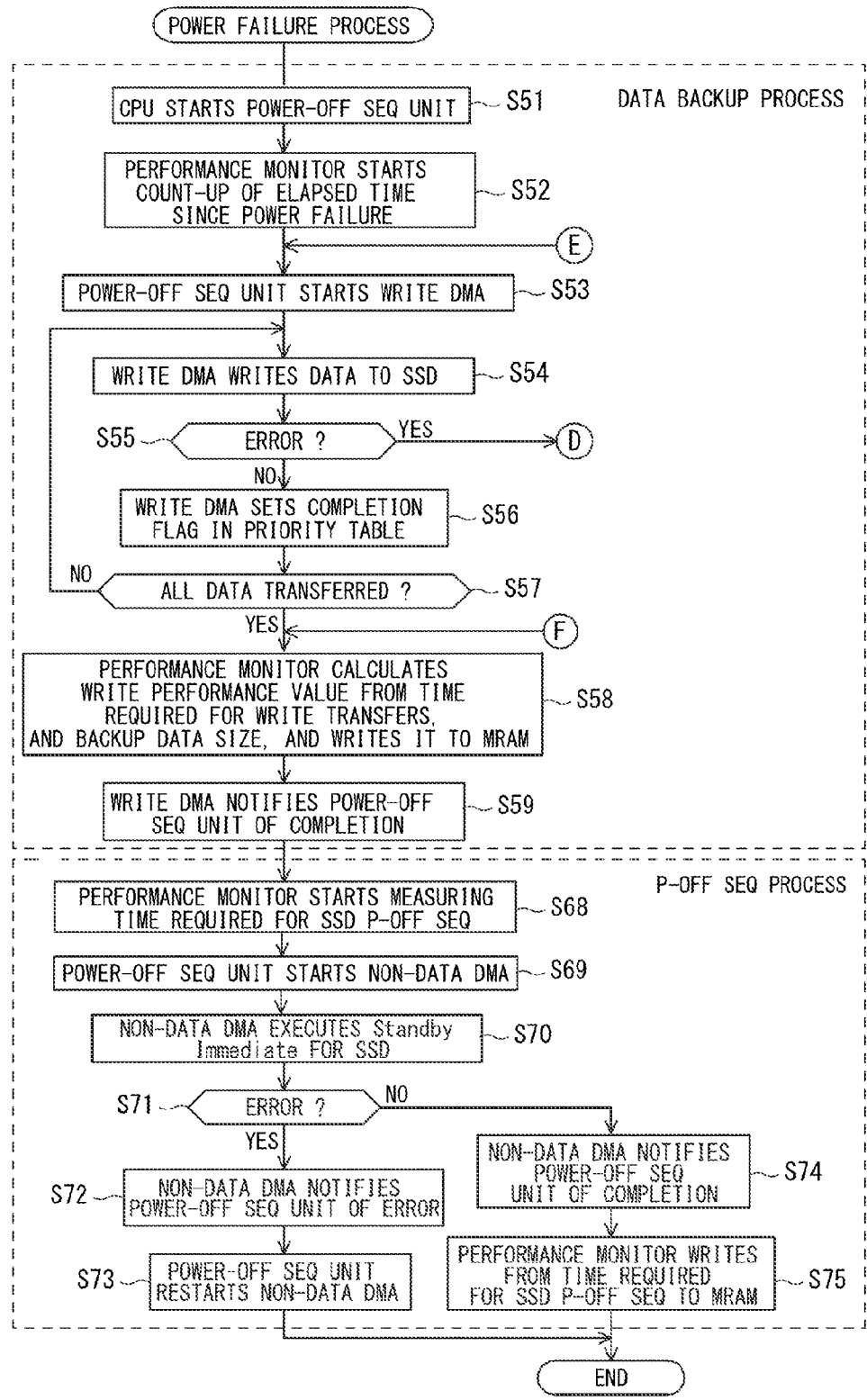
FIGS. 10 and 11 are flowcharts illustrating a power failure process in the information processing apparatus as an example of the second embodiment.
Figure 11:
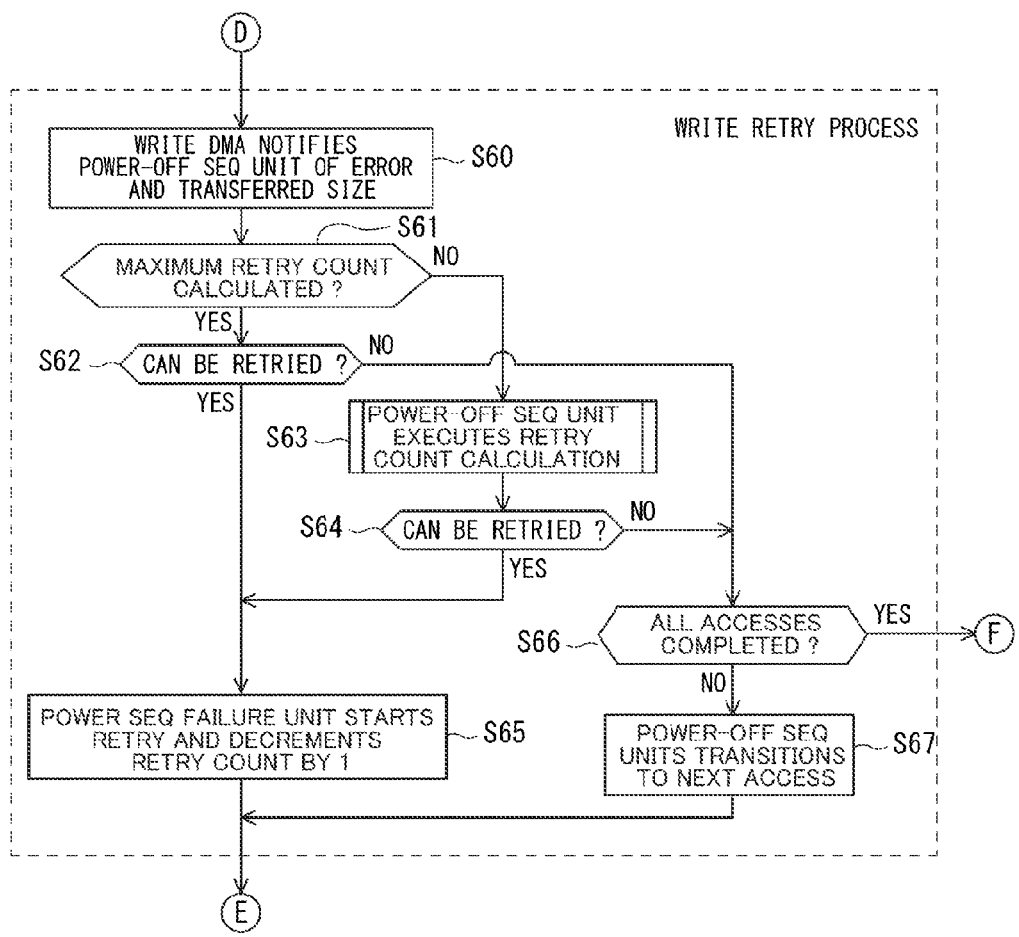

FIGS. 10 and 11 are flowcharts illustrating a power failure process in the information processing apparatus 1' as an example of the second embodiment (Steps S51 to S75). FIG. 10 includes Steps S51 to S59 and S68 to S75, while FIG. 11 includes Steps S60 to S67.

When supply of AC power to the power supply 5 is discontinued in the information processing apparatus 1', due to a power failure and the like, in Step S51, the CPU 2 sets the size and the address of data to be backed up from the cache memory 4 to the SSD 8, and starts the power-off sequence unit 25'. The CPU 2 then transitions to the sleep state for conserving power, until the information processing apparatus 1' is restarted.

Next, in Step S52, the performance monitor 26 started in Step S51 starts counting up the elapsed time since the power failure arises. The performance monitor 26 also checks (determines) how many lanes are currently available among all lanes in the PCIe link 11.

Next, in Step S53, the power-off sequence unit 25' starts the write DMA unit 24.

In Step S54, the write DMA unit 24 writes data to be backed up from the cache memory 4, to the SSD 8.

In Step S55, the write DMA unit 24 determines whether or not an error occurs during any write of the data to be backed up.

If no error occurs (refer to the NO route from Step S55), in Step S56, the write DMA unit 24 sets a value of "1" indicating completion of a backup, to the completion flag field 293 in the priority table 29 for data that has been transferred.

Next, in Step S57, the write DMA unit 24 determines whether or not the entire data to be backed up from the cache memory 4 has been transferred to the SSD 8. Upon this determination, for example, the write DMA unit 24 compares the size of the entire data to be backed up (total backup data size), against the size of data that has already been transferred to the SSD 8 (transferred data size).

If the entire data has not been transferred yet (refer to the NO route from Step S57), the write DMA unit 24 returns to Step S54 and continue to transfer the data.

Otherwise, if the entire data has been transferred (refer to the YES route from Step S57), in Step S58, the performance monitor 26 calculates a write performance value, from the cache memory 4 to the SSD 8 the time spent for the write transfer and the total size of backed-up data in Step S54. The performance monitor 26 then records the calculated write performance value 27 in the MRAM 9

Next, in Step S59, the write DMA unit 24 notifies the power-off sequence unit 25' of the completion of the transfer of the backup data.

Otherwise, if an error occurs in Step S55 (refer to the YES route from Step S55), a write retry process is initiated. Specifically, in Step S60 in FIG. 11, the write DMA unit 24 notifies the power-off sequence unit 25' of the error. Further, the write DMA unit 24 notifies the power-off sequence unit 25' of the size of data that has been transferred to the SSD 8 before the error occurs.

Next, in Step S61, the power-off sequence unit 25' determines whether or not the power-off sequence unit 25' has calculated a maximum retry count.

If a maximum retry count has been calculated (refer to the YES route from Step S61), in Step S62, the power-off sequence unit 25' determines whether or not a retry can be made (i.e., the maximum retry count is one or more).

If a retry can be made (refer to the YES route from Step S62), the flow moves to Step S65 which will be described later.

Otherwise, if no retry can be made (refer to the NO route from Step S62), in Step S66, the power-off sequence unit 25' determines whether or not all accesses have been completed (all transfers have been completed).

If not all of the accesses have been completed (refer to the NO route from Step S66), in Step S67, the power-off sequence unit 25' makes the next access (transfers the next chunk of data).

If all accesses have been completed (refer to the YES route from Step S66), the flow moves to the Step S58 described above.

Otherwise, if a maximum retry count has not been calculated in Step S61 (refer to the NO route from Step S61), in Step S63, the power-off sequence unit 25' executes a retry count calculation which will be described later with reference to FIG. 12.

Next, in Step S64, the power-off sequence unit 25' determines whether or not a retry can be made.

If no retry can be made (refer to the NO route from Step S64), the flow moves to the Step S66 described above.

Otherwise, if a retry can be made (refer to the YES route from Step S64), in Step S65, the power-off sequence unit 25' starts retrying to write data for which the error occurred in Step S54 in FIG. 10, and decrements the retry count by one (−1). Thereafter, the flow moves to Step S53 in FIG. 10 described above The data backup process has been completed. After the data backup process, a power-off sequence on the SSD 8 process is executed. First, in Step S68, the performance monitor 26 starts counting time being spent for the power-off sequence on the SSD 8.

Next, in Step S69, the power-off sequence unit 25' starts the non-data DMA unit 23.

In Step S70, the non-data DMA unit 23 executes the Standby Immediate command on the SSD 8 such that the SSD 8 executes a power-off sequence.

In Step S71, the power-off sequence unit 25' determines whether or not an error occurs in the Standby Immediate command.

If an error occurs (refer to the YES route from Step S71), in Step S72, the non-data DMA unit 23 notifies the power-off sequence unit 25' of the error of the Standby Immediate.

Next, in Step S73, the power-off sequence unit 25' restarts the non-data DMA unit 23, and terminates this flow.

Otherwise, if no error occurs in Step S71 (refer to the NO route from Step S71), in Step S74, the non-data DMA unit 23 notifies the power-off sequence unit 25' of the completion of the Standby Immediate.

In Step S75, the performance monitor 26 records the time spent for a power-off sequence on the SSD 8, in the MRAM 9 as the previous SSD P-OFF SEQ length 28, and terminates this flow.

Figure 12:
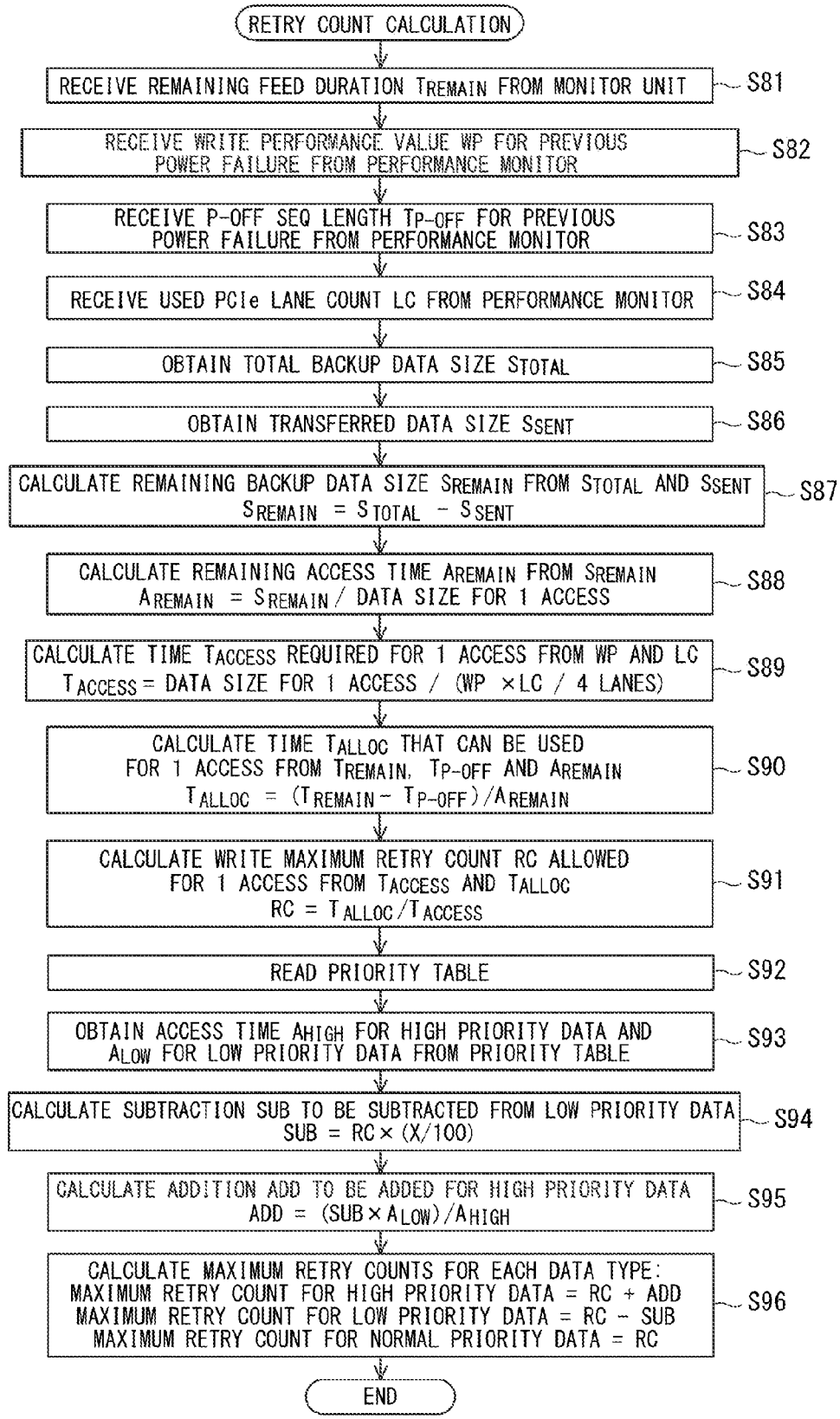
FIG. 12 is a flowchart illustrating a retry count calculation by a power-off sequence unit as an example of the second embodiment.
Figure 14:
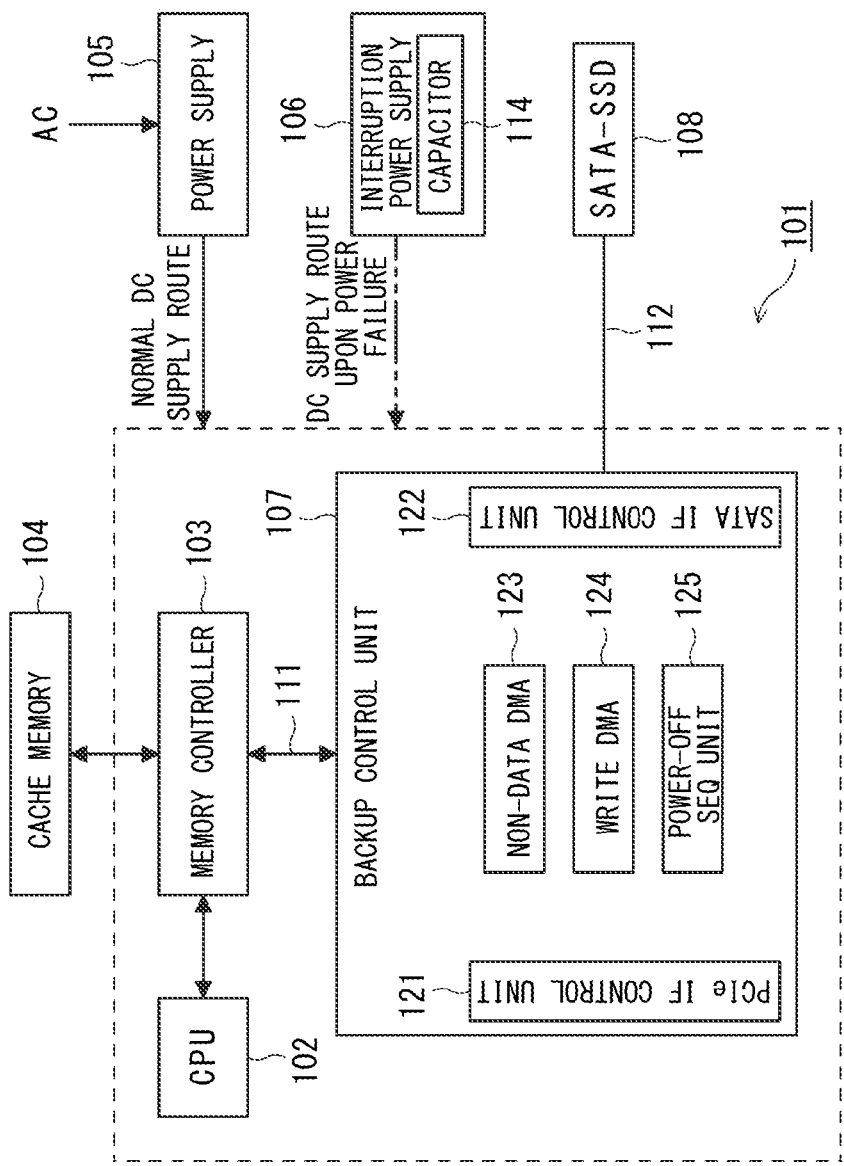
FIG. 14 is a diagram illustrating a configuration of a conventional information processing apparatus.

FIG. 12 is a flowchart illustrating a retry count calculation by a power-off sequence unit 25' as an example of the second embodiment (Steps S81 to S96).

In Step S81, the power-off sequence unit 25' receives, from the monitor unit 10, the remaining feed duration $T_{REMAIN}$ that is the time duration during which the capacitor 14 in the interruption power supply 6 can supply power.

In Step S82, the power-off sequence unit 25' receives, from the performance monitor 26, a write performance value 27 (WP) upon a previous power failure.

Next, in Step S83, the power-off sequence unit 25' requests, to the performance monitor 26, the power-off sequence time $T_{P-OFF}$ that was spent for a previous power-off sequence on the SSD 8, and receives it.

In Step S84, the power-off sequence unit 25' receives a count LC of PCIe lanes that are being used, from the performance monitor 26.

In Step S85, the power-off sequence unit 25' obtains the size $S_{TOTAL}$ of entire data to be backed up from the cache memory 4 to the SSD 8.

Next, in Step S86, the power-off sequence unit 25' obtains the size $S_{SENT}$ of data that has been transferred from the cache memory 4 to the SSD 8.

In Step S87, the power-off sequence unit 25' calculates, from the $S_{TOTAL}$ obtained in Step S85 and the $S_{SENT}$ in Step S86, the size $S_{REMAIN}$ of remaining backup data that is to be backed up to but has not been sent to the SSD 8 using the following Formula (1):

$$S_{REMAIN}=S_{TOTAL}-S_{SENT} \quad (1)$$

In Step S88, the power-off sequence unit 25' calculates, from the $S_{REMAIN}$ obtained in Step S87, the remaining access time $A_{REMAIN}$, representing how many times the SSD 8 is to be accessed for backing up the remaining data, using the following Formula (2):

$$A_{REMAIN}=S_{REMAIN}/\text{data size of a single access} \quad (2)$$

Next, in Step S89, the power-off sequence unit 25' calculates, from WP and LC obtained in Steps S82 and S84, time $T_{ACCESS}$ required for a single access, using the following Formula (3):

$$T_{ACCESS}=\text{data size of a single access}/(WP \times LC/\text{total lane count}) \quad (3)$$

In Step S90, the power-off sequence unit 25' calculates, from the $T_{REMAIN}$ and the $T_{P-OFF}$ obtained in Steps S81 and S83, and the $A_{REMAIN}$ obtained in Step S88, time $T_{ALLOC}$ that is available for a single access, using the following Formula (4):

$$T_{ALLOC}=(T_{REMAIN}-T_{P-OFF})/A_{REMAIN} \quad (4)$$

In Step S91, the power-off sequence unit 25' calculates, from the $T_{ACCESS}$ obtained in Step S89 and the $T_{ALLOC}$ obtained in Step S90, a maximum write retry count RC for a single access using the following Formula (5):

$$RC=T_{ALLOC}/T_{ACCESS} \quad (5)$$

Next, in Step S92, the power-off sequence unit 25' reads, from the MRAM 9, for example, the predetermined ratio 30 (X %) and the priority table 29 that are set and stored in the backup control unit 7' by the CPU 2 in advance.

Next, in Step S93, the power-off sequence unit 25' obtains the access number $A_{HIGH}$ for high-priority data and the access number $A_{LOW}$ for low-priority data, among data that is to be backed up to the SSD 8 but has not been transferred, using he priority table 29 read in Step S92.

In Step S94, the power-off sequence unit 25' calculates the subtraction SUB to be subtracted to obtain the maximum retry count for low-priority data, based on X (%) obtained in Step S91, using the following Formula (6):

$$SUB=RC \times (X/100) \quad (6)$$

In Step S95, the power-off sequence unit 25' calculates the addition ADD to obtain the maximum retry count for high-priority data, from the $A_{HIGH}$ and the $A_{LOW}$ obtained in Step S93 and the SUB obtained in, using the following Formula (7):

$$ADD=(SUB \times A_{LOW})/A_{HIGH} \quad (7)$$

In Step S96, the power-off sequence unit 25' calculates the maximum retry count for priority of data from the RC obtained in Step S91 and the SUB and the ADD obtained in Steps S94 and S95, using the following Formulae (8) to (10):

$$\text{The maximum retry count for high-priority data} = RC + ADD \quad (8)$$

$$\text{The maximum retry count for low-priority data} = RC - SUB \quad (9)$$

$$\text{The maximum retry count for normal-priority data} = RC \quad (10)$$

Thereafter the power-off sequence unit 25' terminates this flow.

FIG. 13 lists exemplary calculations of maximum retry counts by the power-off sequence unit 25' as an example of the second embodiment.

In this example, the total feed duration of the capacitor 14 is 80 seconds, the write performance value WP is 250 MB/s, the data size of a single access is 1 MB, the used lane count LC among the entire PCIe lanes is four lanes, the total backup size $S_{TOTAL}$ is 8 GB, and the previous power-off sequence time $T_{P\text{-}OFF}$ is 1 second. The predetermined ratio X is 50%. In this case, after 30 seconds passes after the power failure (when the remaining feed duration is 50 seconds) and when 7 GB of data has been transferred, a write error occurs. The access number $A_{HIGH}$ of untransferred high-priority data is 100, and the access $A_{LOW}$ of untransferred low-priority data is 200.

In Step S87 in FIG. 12, the power-off sequence unit 25' calculates the remaining backup data size $S_{REMAIN}$ as: $S_{REMAIN}$=total backup data size of 8 GB—transferred data size of 7 GB=1 GB.

Next, in Step S88, the power-off sequence unit 25' calculates the remaining access time $A_{REMAIN}$ as: remaining backup data size of 1 GB/data size of 1 MB per access=1024 accesses.

In Step S89, the power-off sequence unit 25' calculates the time $T_{ACCESS}$ required for a single access as follows: data size of a single access 1 MB/(write performance of 250 MB/s×link count of 4/4 lanes)=4 ms Next, in Step S90, the power-off sequence unit 25' calculates the time $T_{ALLOC}$ that is available for a single access as: (remaining feed duration of 50 seconds−power-off sequence time of 1 second)/remaining access time of 1024 accesses=47 ms.

In Step S91, the power-off sequence unit 25' calculates the write maximum retry count RC available for a single access as: time available for retry of 47 ms/time required for a single access of 4 ms=11 times. This is the maximum retry count for normal-priority data (normal data).

In Step S94, the power-off sequence unit 25' calculates the subtraction SUB to obtain the maximum retry count for low-priority data as: SUB=11×(50/100)=5 (fraction is rounded down).

Next, in Step S95, the power-off sequence unit 25' calculates the addition ADD to obtain the maximum retry count for high-priority data as: ADD=(5×$A_{LOW}$ of 200 accesses)/$A_{HIGH}$ of 100 accesses=10.

In Step S96, the power-off sequence unit 25' determines the maximum retry counts for the respective priorities of data as follows:

Retry count for high-priority data=11+10=21
Retry count for low-priority data=11−5=6
Retry count for normal-priority data=11

As described above, in accordance with an example of the second embodiment, the power-off sequence unit 25' determines write maximum error retry counts based on priorities of data set in the priority table 29, as well as executing the processes as described in the first embodiment. Specifically, the power-off sequence unit 25' sets a smaller value to the maximum retry count for low-priority data, while setting a greater value to the maximum retry count for high-priority data.

By setting a value (e.g., "1") in the priority field 292 in the priority table 29, which indicates a higher priority for important data within the cache memory 4, the maximum retry count for low-priority data can be reduced and the reduced number is added for retries for high-priority data. Accordingly, in addition to the advantageous effects of an example of the first embodiment as described above, an example of the second embodiment has an advantages of further increasing the possibility of successful backup of important data in the information processing apparatus 1' upon a power failure.

(C) Miscellaneous

Note that the present disclosure is not limited to the embodiments described above, and various modifications may be made without departing from the spirit of the present disclosure.

For example, although the maximum write retry error counts are calculated based on the performance value 27, the previous SSD P-OFF SEQ length 28, and the used lane count in the PCIe link 11 in an example of the embodiments described above, any other parameters may be used.

For example, although the SATA-SSD 8 is used as a destination to back up data in the cache memory 4 in an example of the embodiments described above, any other types of nonvolatile memory may be used as a backup destination.

Although three priorities of normal, high, and low, are used in an example of the second embodiment, the number of priorities may be increased or reduced.

Additionally, in an example of the embodiments described above, the backup control units 7 and 7' and the monitor unit 10 are embodied as FPGAs, and the PCIe IF control unit 21, the SATA IF unit 22, the non-data DMA unit 23, the write DMA unit 24, the power-off sequence units 25 and 25', and the performance monitor 26 are embodied as circuits.

However, the backup control units 7 and 7', the monitor unit 10, the PCIe IF control unit 21, the SATA IF unit 22, the non-data DMA unit 23, the write DMA unit 24, the power-off sequence units 25 and 25', and the performance monitor 26 may be implemented as software.

In this case, the CPU 2 in the information processing apparatuses 1 and 1' function as the backup control units 7 and 7', the monitor unit 10, the PCIe IF control unit 21, the SATA IF unit 22, the non-data DMA unit 23, the write DMA unit 24, the power-off sequence units 25 and 25', and the performance monitor 26, by executing a storage control program.

Note that the program (control program) for implementing the functions as the backup control units 7 and 7', the monitor unit 10, the PCIe IF control unit 21, the SATA IF unit 22, the non-data DMA unit 23, the write DMA unit 24, the power-off sequence units 25 and 25', and the performance monitor 26 are provided in the form of programs recorded on a computer read able recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD-DVD), a Blu-ray disc, a magnetic disk, an optical disk, a magneto-optical disk, or the like. The computer then reads a program from that storage medium using a medium reader (not illustrated) and uses that program after transferring it to an internal storage apparatus or external storage apparatus or the like. Alternatively, the program may be recoded on a storage unit (storage medium), for example, a magnetic disk, an optical disk, a magneto-optical disk, or the like, and the program may be provided from the storage unit to the computer through a communication path.

Upon embodying the functions as the backup control units 7 and 7', the monitor unit 10, the PCIe IF control unit 21, the SATA IF unit 22, the non-data DMA unit 23, the write DMA unit 24, the power-off sequence units 25 and 25', and the performance monitor 26, programs stored in internal storage apparatuses (MRAM 9 or the like in the above embodiments) are executed by a microprocessor of the computer (the CPU 2 in the above embodiments). In this case, the computer may alternatively read a program stored in a storage medium for executing it.

In accordance with the present embodiments, the reliability of an information processing apparatus can be improved.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A control apparatus that causes data in a first storage unit to be written in a second storage unit, with power supplied from a sub power supply, when supply of power from a main power supply is discontinued, the control apparatus comprising:
    a remaining feed duration obtaining unit that obtains remaining feed duration during which the sub power supply can supply the power; and
    a retry count setting unit that calculates a maximum retry count based on the remaining feed duration obtained by the remaining feed duration obtaining unit, and sets the calculated maximum retry count as a maximum retry count used when an error occurs while the data from the first storage unit to the second storage unit is being written during the sub power supply supplies the power.

2. The control apparatus according to claim 1, wherein
    a power-off sequence is executed on the second storage unit before the supply of the power is stopped, and
    the retry count setting unit sets the maximum retry count further based on time that has been spent for a previous power-off sequence for the second storage unit.

3. The control apparatus according to claim 1, further comprising a recording unit that records data transfer time for transferring the data from the first storage unit to the second storage unit, when supply of the power from the main power supply is discontinued last time, wherein the retry count setting unit sets the maximum retry count further based on the data transfer time.

4. The control apparatus according to claim 1, further comprising priority information that contains, for each piece of data in the first storage unit, a priority for writing the piece of data from the first storage unit to the second storage unit, wherein the retry count setting unit sets the maximum retry count further based on the priority information.

5. The control apparatus according to claim 4, wherein the retry count setting unit sets different maximum retry counts for different pieces of data in the first storage unit, based on the priority information.

6. The control apparatus according to claim 1, wherein the retry count setting unit sets the maximum retry count further based on a count of one or more data transfer links available between the first storage unit and the second storage unit.

7. A non-transitory computer-readable recording medium storing a program for causing data in a first storage unit to be written in a second storage unit, with power supplied from a sub power supply, when supply of power from a main power supply is discontinued, the program causing a computer to:
    obtain remaining feed duration during which the sub power supply can supply the power; and
    calculate a maximum retry count based on the remaining feed duration obtained by the remaining feed duration obtaining unit, and sets the calculated maximum retry count as a maximum retry count used when an error occurs while the data from the first storage unit to the second storage unit is being written during the sub power supply supplies the power.

8. The non-transitory computer-readable recording medium according to claim 7, wherein
    a power-off sequence is executed on the second storage unit before the supply of the power is stopped, and
    the program causes the computer to set the maximum retry count further based on time that has been spent for a previous power-off sequence for the second storage unit.

9. The non-transitory computer-readable recording medium according to claim 7, wherein the program further causes the computer to:
    record data transfer time for transferring the data from the first storage unit to the second storage unit, when supply of the power from the main power supply is discontinued last time, and
    set the maximum retry count further based on the data transfer time.

10. The non-transitory computer-readable recording medium according to claim 7, wherein the program further causes the computer to:
    store priority information that contains, for each piece of data in the first storage unit, a priority for writing the piece of data from the first storage unit to the second storage unit, and
    set the maximum retry count further based on the priority information.

11. The non-transitory computer-readable recording medium according to claim 10, wherein the program causes the computer to set different maximum retry counts for different pieces of data in the first storage unit, based on the priority information.

12. The non-transitory computer-readable recording medium according to claim 7, wherein the program causes the computer to set the maximum retry count further based on a count of one or more data transfer links available between the first storage unit and the second storage unit.

13. An information processing apparatus comprising:
    a main power supply;
    a sub power supply;
    a first storage unit;
    a second storage unit; and a control apparatus that causes data in the first storage unit to be written in the second storage unit, with power supplied from the sub power supply, when supply of power from the main power supply is discontinued, the control apparatus comprising:
- a remaining feed duration obtaining unit that obtains remaining feed duration during which the sub power supply can supply the power; and
- a retry count setting unit that calculates a maximum retry count based on the remaining feed duration obtained by the remaining feed duration obtaining unit, and sets the calculated maximum retry count as a maximum retry count used when an error occurs while the data from the first storage unit to the second storage unit is being written during the sub power supply supplies the power.

14. The information processing apparatus according to claim 13, wherein
the control apparatus further comprises priority information that contains, for each piece of data in the first storage unit, a priority for writing the piece of data from the first storage unit to the second storage unit, and
the retry count setting unit sets the maximum retry count further based on the priority information.

15. A control apparatus that causes data in a first storage unit to be written in a second storage unit, with power supplied from a sub power supply, when supply of power from a main power supply is discontinued, the control apparatus comprising:
a retry count setting unit that sets different maximum retry counts for different pieces of data in the first storage unit based on priority information containing, for each piece of data in the first storage unit, a priority for writing the piece of data from the first storage unit to the second storage unit and sets the calculated maximum retry count as a maximum retry count used when an error occurs while the data from the first storage unit to the second storage unit is being written during the sub power supply supplies the power.

* * * * *